United States Patent
Jamjoom et al.

(10) Patent No.: US 9,317,328 B2
(45) Date of Patent: *Apr. 19, 2016

(54) STRATEGIC PLACEMENT OF JOBS FOR SPATIAL ELASTICITY IN A HIGH-PERFORMANCE COMPUTING ENVIRONMENT

(71) Applicant: International Business Machines Corporation, Armonk, NY (US)

(72) Inventors: Hani Talal Jamjoom, Cos Cob, CT (US); Dinesh Kumar, Sleepy Hollow, NY (US); Zon-Yin Shae, Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 215 days.

This patent is subject to a terminal disclaimer.

(21) Appl. No.: 14/029,925

(22) Filed: Sep. 18, 2013

(65) Prior Publication Data

US 2014/0351823 A1   Nov. 27, 2014

Related U.S. Application Data

(63) Continuation of application No. 13/902,184, filed on May 24, 2013.

(51) Int. Cl.
*G06F 9/46*   (2006.01)
*G06F 9/50*   (2006.01)

(52) U.S. Cl.
CPC   *G06F 9/50* (2013.01); *G06F 9/505* (2013.01); *G06F 9/5027* (2013.01); *G06F 9/5061* (2013.01); *G06F 9/5094* (2013.01)

(58) Field of Classification Search
None
See application file for complete search history.

(56) References Cited

U.S. PATENT DOCUMENTS

| | | | | |
|---|---|---|---|---|
| 7,421,575 | B2 * | 9/2008 | Ang | G06F 15/17343 713/1 |
| 9,069,881 | B2 * | 6/2015 | Ferdous | G06F 11/3089 |
| 2006/0101464 | A1 * | 5/2006 | Dohrmann | 718/100 |
| 2007/0169042 | A1 * | 7/2007 | Janczewski | 717/149 |
| 2007/0220522 | A1 * | 9/2007 | Coene et al. | 718/104 |
| 2009/0025004 | A1 * | 1/2009 | Barnard et al. | 718/104 |
| 2009/0094481 | A1 * | 4/2009 | Vera et al. | 714/11 |

(Continued)

OTHER PUBLICATIONS

Kumar et al. "Scheduling Batch and Heterogeneous Jobs with Runtime Elasticity in a Parallel Processing Environment", IBM, 2012 IEEE 26th IPDPSW, May 21-25, 2012 (Kumar_2012.pdf; pp. 1-14).*

(Continued)

*Primary Examiner* — Hiren Patel
(74) *Attorney, Agent, or Firm* — Harrington & Smith; Louis J. Percello

(57) ABSTRACT

Accepting a job having a job size representing a number or quantity of processors; computing an expected size, and a standard deviation in size, for the accepted job; adding the expected size to the standard deviation in size to determine a sum; comparing the sum to a number or quantity of available clusters at each of a plurality of non-leaf nodes of a tree representing a high-performance computing environment; and when the number or quantity of available clusters is more than the sum at a sub-tree of the tree and, going down one level further in the sub-tree, the number of available clusters is less than the sum, selecting the sub-tree for the accepted job such that the accepted job is placed on one or more clusters associated with the selected sub-tree.

9 Claims, 8 Drawing Sheets

(56) References Cited

U.S. PATENT DOCUMENTS

| | | | | |
|---|---|---|---|---|
| 2009/0094605 | A1* | 4/2009 | Brelsford et al. | 718/100 |
| 2009/0328047 | A1* | 12/2009 | Li et al. | 718/102 |
| 2010/0083273 | A1* | 4/2010 | Sihn et al. | 718/104 |
| 2011/0088038 | A1* | 4/2011 | Kruglick | 718/104 |
| 2011/0131583 | A1* | 6/2011 | Geraci .............. G06F 9/505 | 718/104 |
| 2011/0302582 | A1* | 12/2011 | Jacobson et al. | 718/102 |
| 2012/0079501 | A1* | 3/2012 | Sandstrom ......... G06F 9/5066 | 718/105 |
| 2012/0180062 | A1* | 7/2012 | Sohi et al. | 718/104 |
| 2013/0239115 | A1* | 9/2013 | Kato | 718/104 |
| 2013/0346969 | A1* | 12/2013 | Shanmuganathan . G06F 9/4856 | 718/1 |
| 2014/0282578 | A1* | 9/2014 | Teller .............. G06F 9/5088 | 718/104 |

OTHER PUBLICATIONS

Feitelson; "Job Scheduling in Multiprogrammed Parallel Systems—Extended Version," IBM Research Report RC 19790 (87657), Oct. 1994, Second Revision, Aug. 1997 (175 pages).

Phillip Krueger, Ten-Hwang Lai, Member, Zeee, and Vibha A. Dixit-Radiya; "Job Scheduling Is More Important than Processor Allocation for Hypercube Computers," IEEE Transactions on Parallel and Distributed Systems, vol. 5, No. 5, May 1994 (10 pages).

Krevat, et al.; "Job Scheduling for the Bluegene L System," Euro-Par 2002. Parallel Processing: 8th International Euro-Par Conference Paderborn, Germany, Aug. 27-30, 2002 Proceedings (Lecture Notes in Computer Science) (14 pages).

Mualem, et al.; "Utilization Predictability Workloads and User Runtime Estimates in Scheduling the IBM SP2 with Backfilling," IEEE Transactions on Parallel and Distributed Systems, vol. 12, No. 6, Jun. 2001 (15 pages).

Murthy V. Devarakonda and Ravishankar K. Iyer, Senior Member, IEEE; "Predictability of Process Resource Usage: A Measurement-Based Study on UNIX," IEEE Transactions on Software Engineering, vol. 15, No. 12, Dec. 1989 (8 pages).

Edi Shmueli and Dror G. Feitelson,; "Backfilling with Lookahead to Optimize the Packing of Parallel Jobs," J. of Parallel & Distributed Comput. (JPDC}, 2005, vol. 65, pp. 1090-1107.

Buyya, Rajkumar, "High Performance Cluster Computing: Programming and Applications, vol. 2", School of Computer Science and Software Engineering, Monash University, Prentice Hall, 1999, 664 pgs.

Buyya, Rajkumar, "High Performance Cluster Computing: Architectures and Systems, vol. 1", School of computer Science and Software Engineering, Monash University, Prentice Hall, 1999, 849 pgs.

Krakovviak, Sacha, "Principles of Operating Systems", Massachusetts Institute of Technology, 1988, 469 pgs.

\* cited by examiner

STRATEGIC PLACEMENT OF JOBS FOR SPATIAL ELASTICITY IN A HIGH-PERFORMANCE COMPUTING ENVIRONMENT

CROSS-REFERENCE TO RELATED APPLICATION

This patent application is a continuation of copending U.S. patent application Ser. No. 13/902,184 filed on May 24, 2013, the disclosure of which is incorporated herein by reference in its entirety.

BACKGROUND

1. Technical Field

The exemplary and non-limiting embodiments of the invention relate generally to cloud computing and, more particularly, to strategic placement of jobs for spatial elasticity in high-performance computing environments.

2. Brief Description of Prior Developments

The cloud computing model is emerging as a de facto mechanism for offering computing services. This new model is being embraced to improve the consumability of High-Performance Computing (HPC) services.

BRIEF SUMMARY

The following summary is merely intended to be exemplary. The summary is not intended to limit the scope of the claims.

In accordance with one aspect of the invention, a method comprises allocating a quantity of processors for processing a job in a high-performance computing environment to provide an initial allocation, modifying the initial allocation during a run time of the job by performing one or more of: increasing the allocated quantity of processors in response to the job being extended in size by allocating one or more free processors from a pool of free processors which are configured to meet an increased computing demand for the job; or decreasing the allocated quantity of processors in response to the job being decreased in size by reallocating one or more processors from the allocated quantity of processors to the pool of free processors.

In accordance with another aspect of the invention, a method comprises allocating a job for execution by a quantity of processors. A first probability value is determined that specifies the probability of the job being extended in size during a run time of the job. A second probability value is determined that specifies the probability of the job being reduced in size during the run time of the job. During the run time of the job, the job is extended in size as specified by the first probability value, or the job is reduced in size as specified by the second probability value. When the job is extended in size, the job is allocated to either a sparsely occupied area of processors or a densely occupied area of processors based upon the first probability value. When the job is reduced in size, the job is allocated to either the sparsely occupied area of processors or the densely occupied area of processors based upon the second probability value.

In accordance with another aspect of the invention, a method comprises allocating a quantity of processors for processing a job in a high-performance computing environment to provide an initial allocation. A probability value is determined that specifies the probability of the job being extended in size during a run time of the job. During the run time of the job, the job is extended in size. The initial allocation is modified during the run time of the job by increasing the allocated quantity of processors in response to the job being extended in size by allocating one or more free processors to the job from a pool of free processors which are configured to meet an increased computing demand for the job. The one or more free processors assigned to the job are within a vicinity of the quantity of processors used to provide the initial allocation. When the probability value is greater than a threshold value, the job is allocated to a first area of processors, and when the probability value is below the threshold value, the job is allocated to a second area of processors having a density greater than the first area of processors.

In accordance with another aspect of the invention, a method comprises accepting a job having a job size representing a number or quantity of processors; computing an expected size, and a standard deviation in size, for the accepted job; adding the expected size to the standard deviation in size to determine a sum; comparing the sum to a number or quantity of available clusters at each of a plurality of non-leaf nodes of a tree representing a high-performance computing environment; and when the number or quantity of available clusters is more than the sum at a sub-tree of the tree and, going down one level further in the sub-tree, the number of available clusters is less than the sum, selecting the sub-tree for the accepted job such that the accepted job is placed on one or more clusters associated with the selected sub-tree.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION

Figure 1:
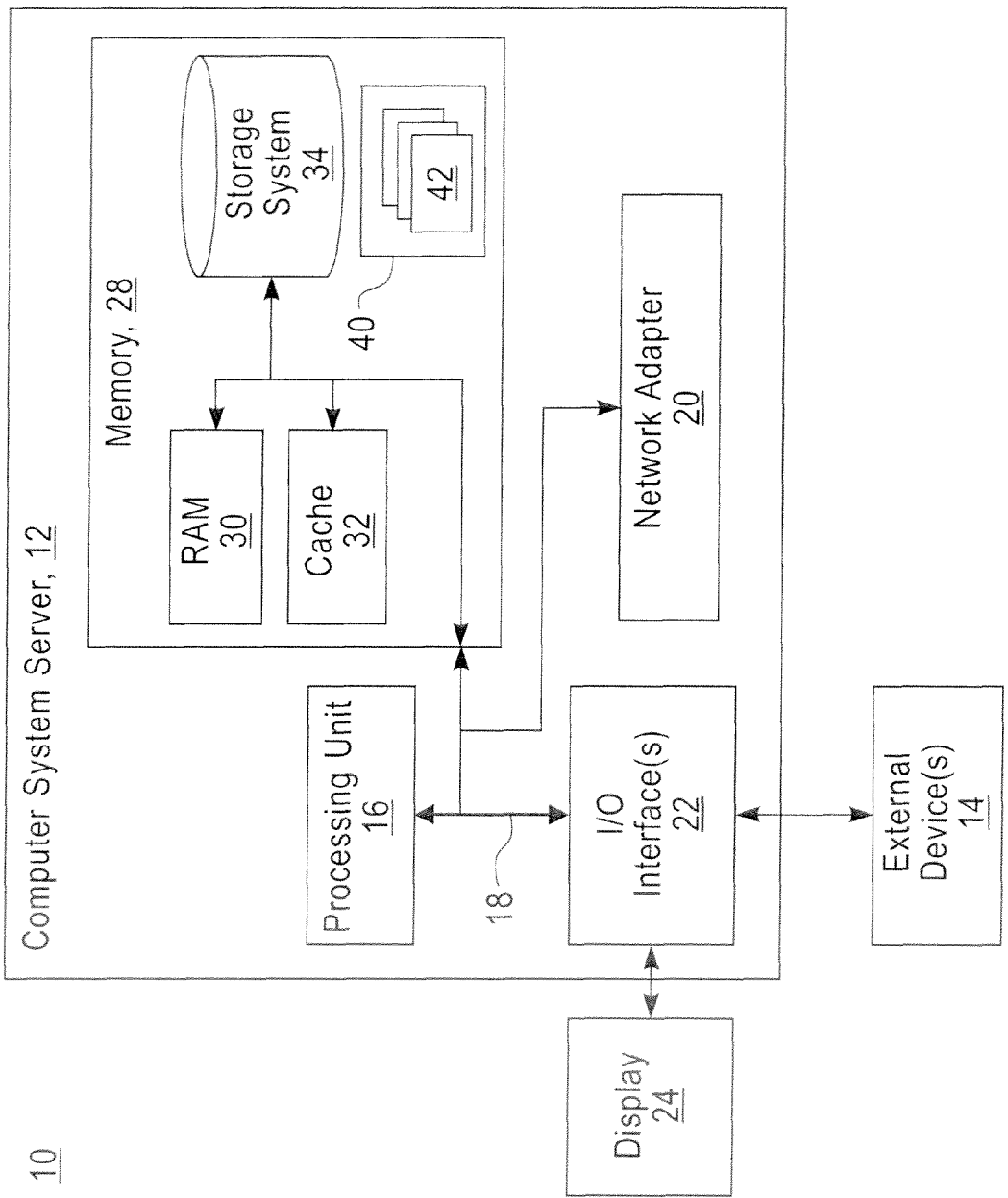
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
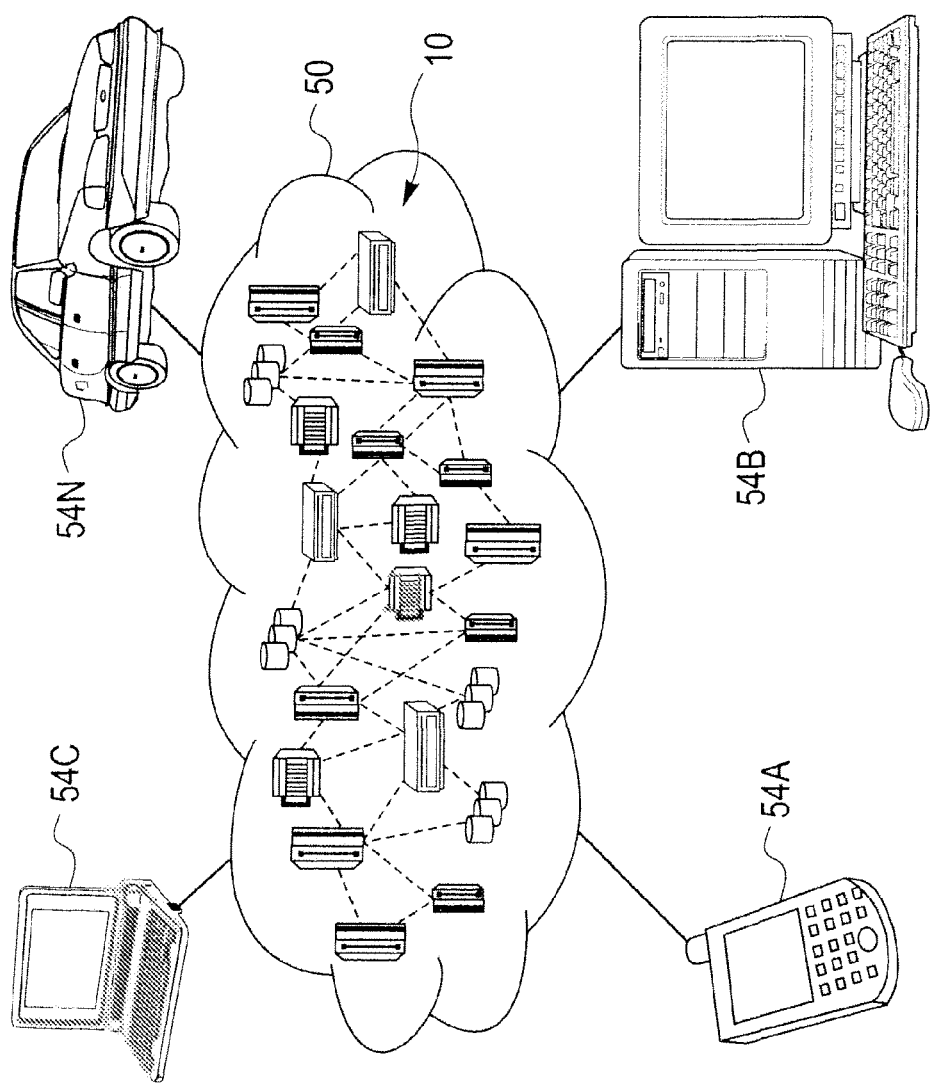
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
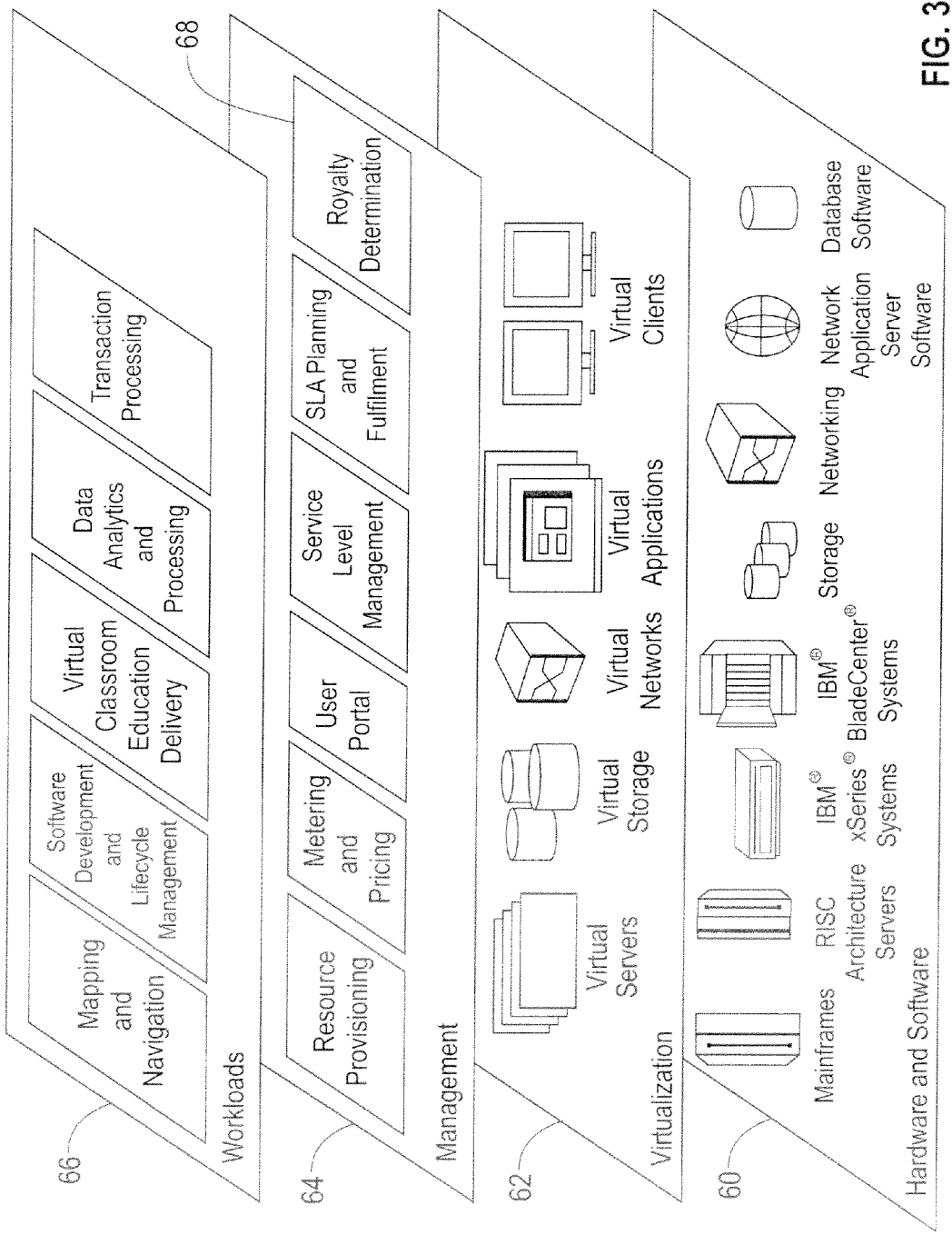
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® ZSERIES® systems; RISC (Reduced Instruction Set Computer) architecture based servers, in one example IBM PSERIES® systems; IBM XSERIES® systems; IBM BLADECENTER® systems; storage devices; networks and networking components. Examples of software components include network application server software, in one example IBM WEBSPHERE® application server software; and database software, in one example IBM DB2® database software. (IBM, ZSERIES, PSERIES, XSERIES, BLADECENTER, WEBSPHERE, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and Royalty determination 68 may be provided as one of the functions of the management layer 64. Royalty distribution may, but need not, be based on a business-to-business agreement. Thus, royalty distribution can be based on a pre-signed agreement. However, it may be difficult to follow this model for individual contributors on a cloud platform. On a cloud platform, an individual user can contribute to an image or composed service and make it public as a catalog item. Thus, royalty distribution could, but need not, be performed at a finer granularity. Royalty distribution could be performed, for example, at a resource usage level to keep track of individual contributions and contribution value/impact dynamically, and to distribute royalty to the contributors.

The cloud computing model is emerging as a de facto mechanism for offering computing services. This new model is being embraced to improve the consumability of High-Performance Computing (HPC) services. From a historical perspective, cloud computing is not an entirely new concept in the HPC domain. Grid Computing, for instance, has attracted significant research interest over the last decade or so, much of which focused on fundamental problems in federated resource management. Most optimizations revolve around the manner in which an HPC system is packed and how the queue is managed to maximize system utilization while minimizing job wait times. These optimization problems have led to design of various job scheduling algorithms for HPC systems to schedule incoming jobs.

At present, scant attention has been devoted to improved strategies for job placement over the given space of processors in an HPC environment. Accordingly, the present disclosure considers the impact of demand elasticity—a key ingredient in the cloud service model—on job placement. In the cloud model, elasticity operates across two dimensions: time and (resource) space. Essentially, all users are expected to get what they want, when they want it, and pay for what they use.

There are two different types of elasticity: submit-time elasticity and run-time elasticity. Submit-time elasticity allows varying resource requirements to be specified at submission time. By contrast, run-time elasticity gives its users the ability to change their resource requirements on the fly. Today's cloud resource demand model allows for both types of elasticity, whereas general HPC schedulers implement submit-time elasticity only. The challenge, then, is how should HPC schedulers and placement algorithms best manage the underlying resources under the complete demand model, similar to what is being offered by mainstream clouds?

HPC job placement strategies will be considered. Part of the challenge in job placement relates to the aggressive system utilization levels that HPC systems target. It is not uncommon for an HPC system to exceed 80% utilization. By contrast, mainstream data centers often run at 15% utilization. Especially with the use of virtualization, cloud data centers have significant spare capacity to provide run-time elasticity. Even in the absence abundant spare capacity and virtualization, a well designed HPC job placement strategy can provide a certain degree of run-time elasticity. This can be accomplished by decomposing the problem into the following sub-components:

Time Elasticity: A key dimensions of runtime elasticity is the time dimension. Here, a job can explicitly change its time requirements after it starts (e.g., modify the kill-by time). A straightforward implementation of time elasticity can negatively impact future jobs. Therefore, a careful balance is required between running jobs needing more time and future jobs waiting in the queue.

Spatial Elasticity: A job can request additional resources in mid-computation. Tight spatial packing of resources to maximize resource utilization makes it difficult to fulfill resource fluctuation, especially if a running job cannot be moved easily and tight spatial coupling is needed. The answer is to take advantage of spatial properties of the underlying hardware, along with stochastic properties of running jobs, to balance between high system utilization and changes in resource needs. In general, conventional job placement strategies do not address techniques for providing spatial elasticity. Thus, job placement strategies for achieving spatial elasticity in an HPC environment will be described in greater detail hereinafter.

Figure 4:
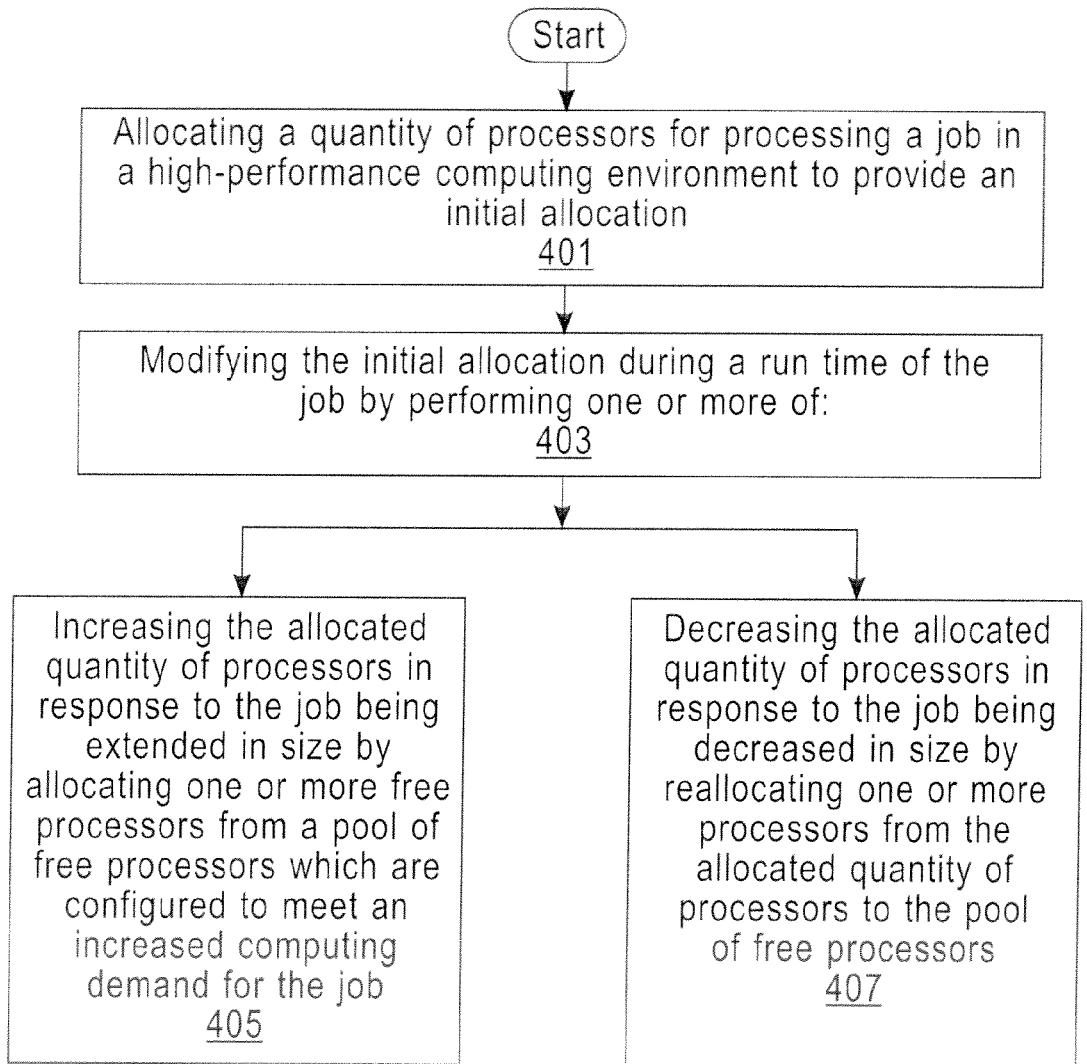
FIG. 4 is a flowchart illustrating a first exemplary method according to a set of embodiments of the present invention.

FIG. 4 is a flowchart illustrating a first exemplary method according to a set of embodiments of the present invention. The operational sequence commences at block 401 where a quantity of processors is allocated for processing a job in a high-performance computing environment to provide an initial allocation. At block 403, the initial allocation is modified during a run time of the job. This modification is performed by (a) increasing the allocated quantity of processors in response to the job being extended in size by allocating one or more free processors from a pool of free processors which are configured to meet an increased computing demand for the job (block 405); or (b) decreasing the allocated quantity of processors in response to the job being decreased in size by reallocating one or more processors from the allocated quantity of processors to the pool of free processors (block 407). Alternatively or additionally, blocks 405 and 407 may be performed at different times during the run time of a given job.

Figure 5:
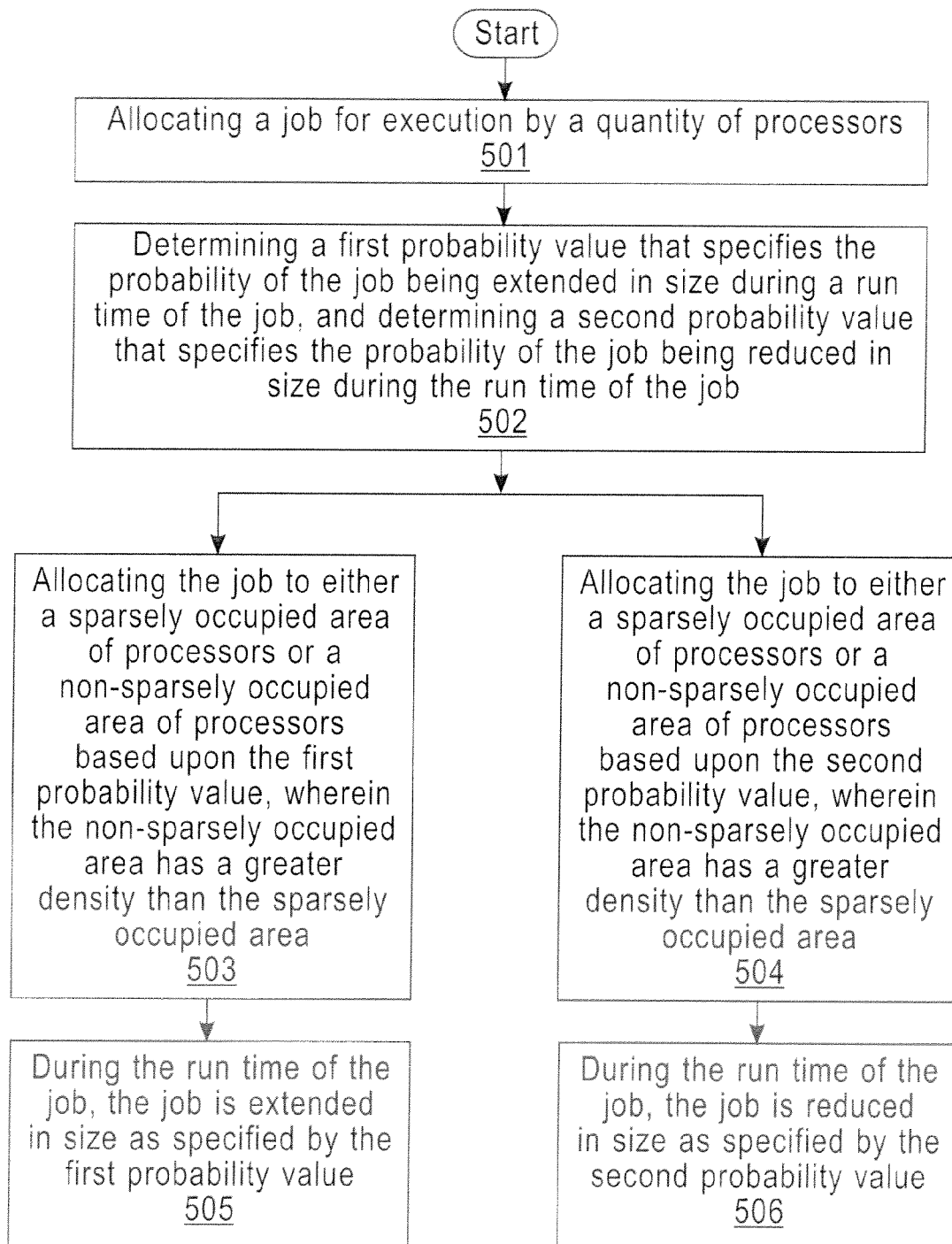
FIG. 5 is a flowchart illustrating a second exemplary method according to a set of embodiments of the present invention.

FIG. 5 is a flowchart illustrating a second exemplary method according to a set of embodiments of the present invention. The operational sequence commences at block 501 where a job is allocated for execution by a quantity of processors. Next, at block 502, a first probability value is determined that specifies the probability of the job being extended in size during a run time of the job. A second probability value is determined that specifies the probability of the job being reduced in size during the run time of the job. During the run time of the job, the job is extended in size as specified by the first probability value (block 503), or the job is reduced in size as specified by the second probability value (block 504), or blocks 503 and 504 may both be performed such that each block 503, 504 is performed at a different time during the run time of the job. When the job is extended in size (block 503), the job is allocated to either a sparsely occupied area of processors or a densely occupied area of processors based upon the first probability value (block 505). When the job is reduced in size (block 504), the job is allocated to either the sparsely occupied area of processors or the densely occupied area of processors based upon the second probability value (block 506).

Figure 6:
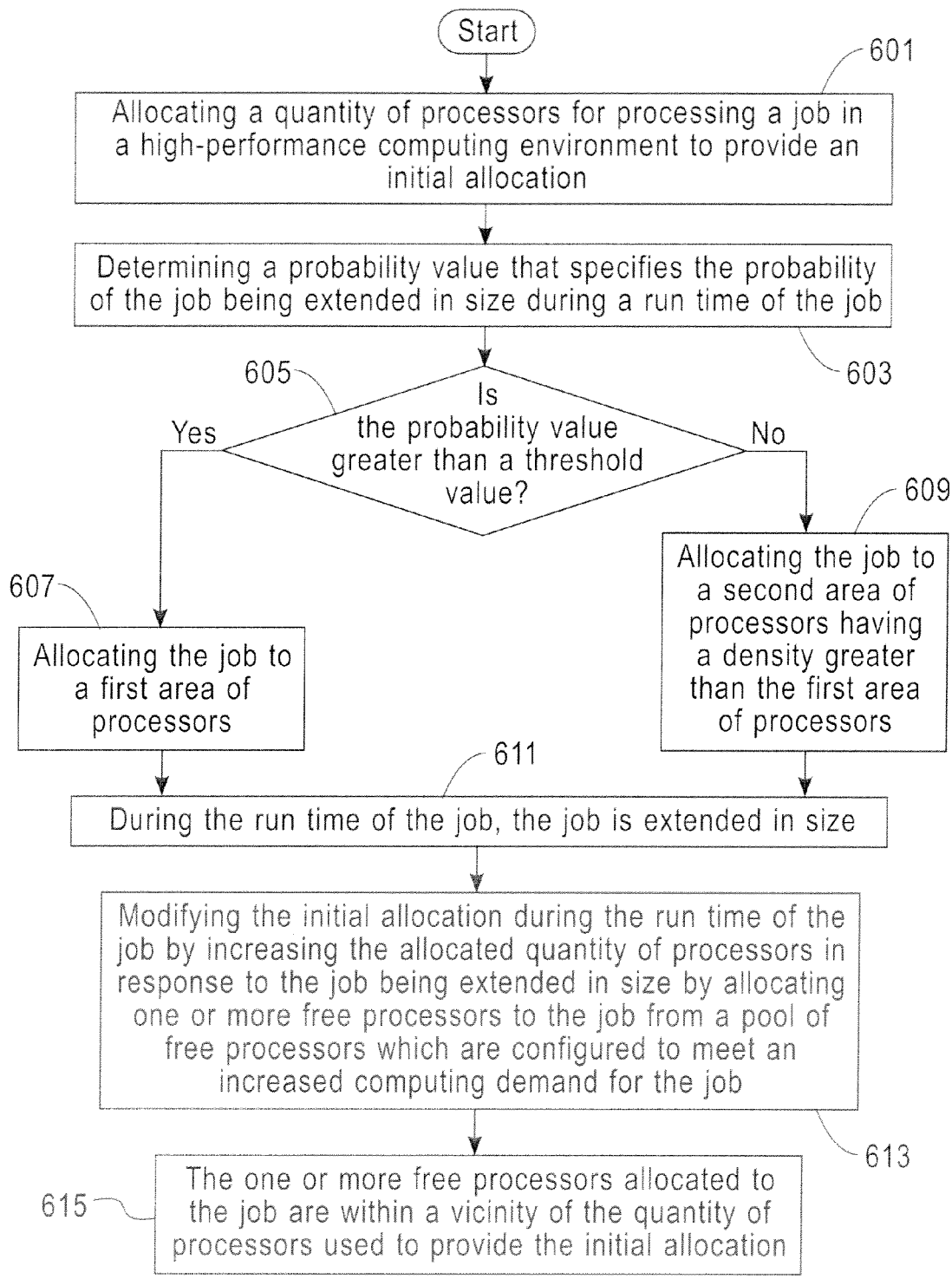
FIG. 6 is a flowchart illustrating a third exemplary method according to a set of embodiments of the present invention.

FIG. 6 is a flowchart illustrating a third exemplary method according to a set of embodiments of the present invention. The operational sequence commences at block 601 where a quantity of processors is allocated for processing a job in a high-performance computing environment to provide an initial allocation. A probability value is determined that specifies the probability of the job being extended in size during a run time of the job (block 602). During the run time of the job, the job is extended in size (block 603). The initial allocation is modified during the run time of the job by increasing the allocated quantity of processors in response to the job being extended in size by allocating one or more free processors to the job from a pool of free processors which are configured to meet an increased computing demand for the job (block 605). The one or more free processors assigned to the job are within a vicinity of the quantity of processors used to provide the initial allocation (block 607). A test is performed at block 609 to ascertain whether or not the probability value is greater than a threshold value. When the probability value is greater than the threshold value, the job is allocated to a first area of processors (block 611). When the probability value is below the threshold value, the job is allocated to a second area of processors having a density greater than the first area of processors (block 613). The first area of processors may be referred to as a sparse area, and the second area of processors may be referred to as a dense area.

In accordance with a further aspect of the invention, the distinction between sparse and dense areas of processors and the algorithm for selecting these areas is determined by the underlying HPC hardware architecture. An exemplary algorithm for job placement in an HPC architecture is described herein. As an illustrative example, one may consider an architecture known as BlueGene/P in which processors are clustered in groups of 32-node clusters. Jobs are executed on the 32-node clusters that can be accessed through a binary tree structure. It should be understood that the binary tree structure is considered as an illustrative example and could be generalized to comprise a generic tree from another HPC architecture. A single job may run on contiguous set of clusters only.

Figure 7:
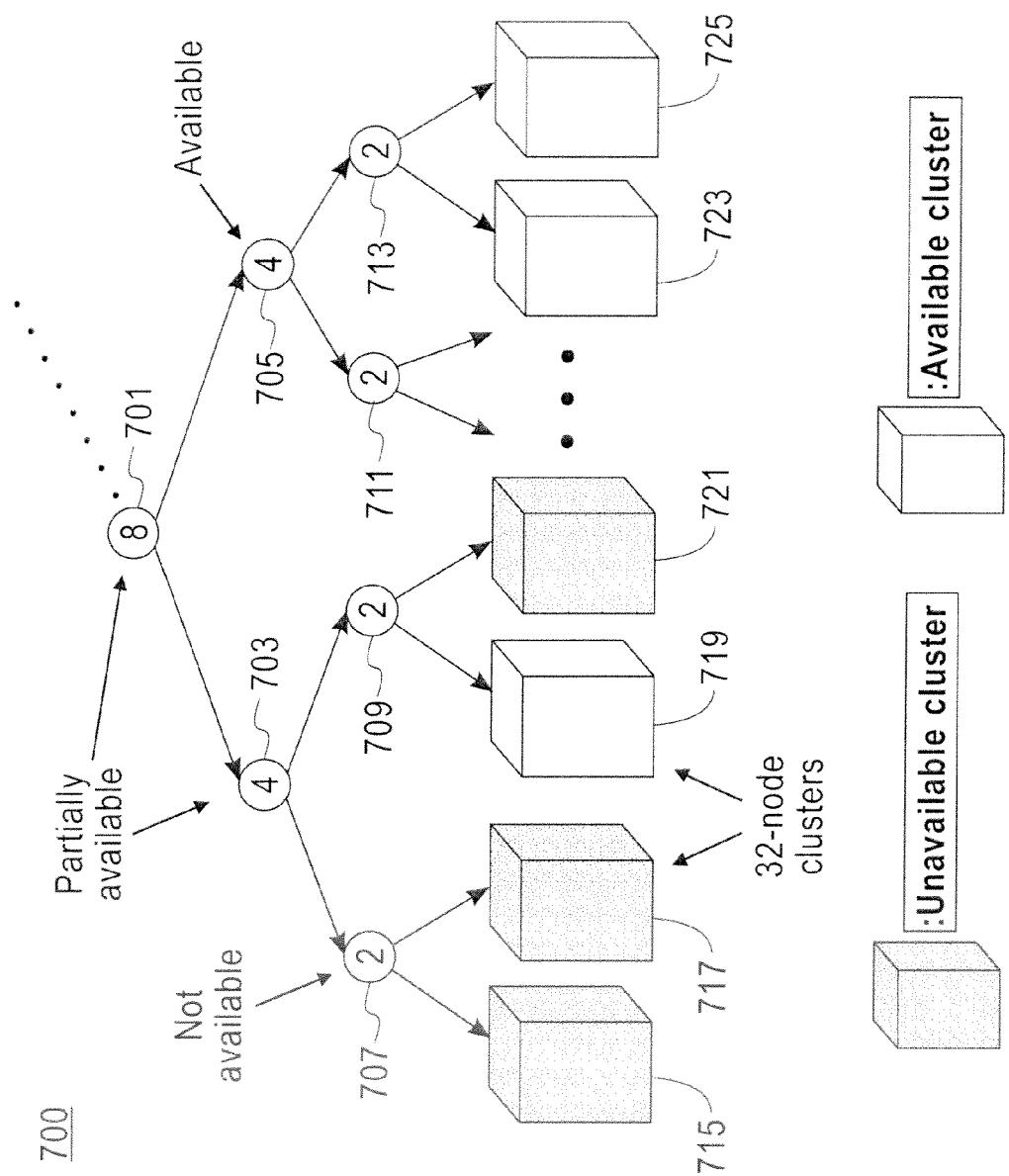
FIG. 7 is a data structure diagram showing an exemplary sub-tree of a binary tree structure comprising an architectural representation of an illustrative high performance computing environment.

FIG. 7 is a data structure diagram showing an exemplary sub-tree 700 of a binary tree structure comprising an architectural representation of an illustrative high performance computing environment. The sub-tree 700 includes a plurality of interconnected non-leaf nodes 701, 703 and 705 that are interconnected with a plurality of leaf nodes 707, 709, 711, and 713 in a tree structure. Each of a plurality of cuboids 715, 717, 719, 721, 723 and 725 at the leaf nodes 707, 709, and 713, respectively, represents a 32-node cluster. Each circle at the non-leaf nodes 701, 703, and 705 represents the total number of 32-node clusters that can be accessed in a sub-tree which is rooted at that circle. It is assumed that size of jobs may be represented only in integer multiples of 32 processors, each 32 processors corresponding to a 32-node cluster such as any one of the cuboids 715, 717, 719, 721, 723, and 725. Therefore, each job can be running on an integer number of clusters only.

A shaded cuboid, such as cuboids 715, 717, and 721, represents an unavailable cluster that is occupied by a running job. A white or unshaded cuboid, such as cuboids 719, 723 and 725, represents an available cluster that is not occupied by any of the running jobs. A completely shaded circle, such as leaf node 707, denotes that all clusters in its sub-tree (such as cuboids 715 and 717) are occupied (not available for processing jobs). A partially shaded circle, such as leaf node 709, indicates that only some of the clusters in its sub-tree (such as cuboid 719) are available for processing jobs. A unshaded circle, such as non-leaf node 705 and leaf nodes 723 and 725, indicates that all clusters in the sub-tree of that node are available for processing jobs.

Figure 8:
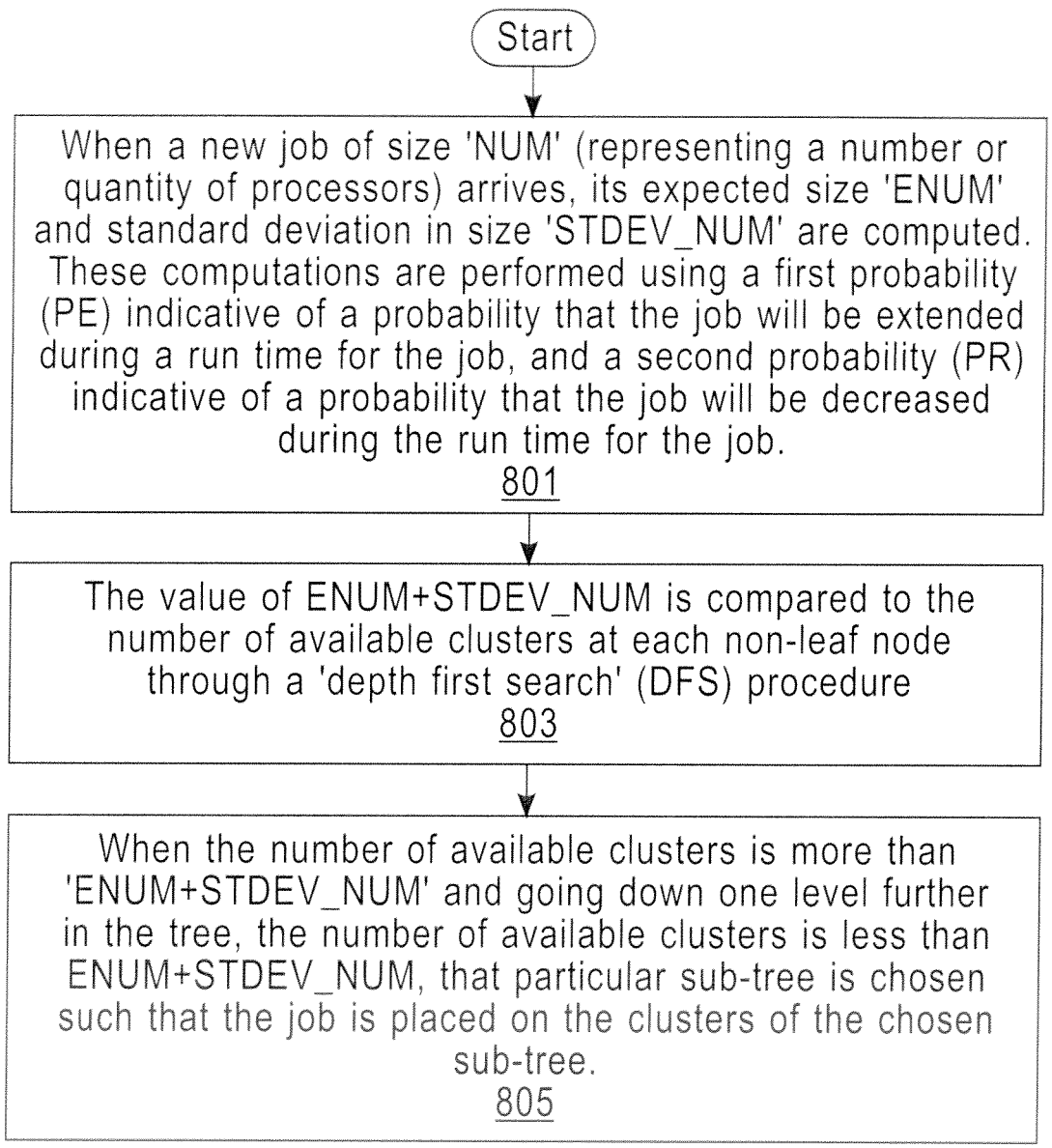
FIG. 8 is a flowchart illustrating a fourth exemplary method according to a set of embodiments of the present invention.

FIG. 8 is a flowchart illustrating a fourth exemplary method according to a set of embodiments of the present invention. When a new job of size 'num' (representing a number or quantity of processors) arrives, its expected size 'enum' and standard deviation in size 'stdev_num' are computed (block 801). These computations are performed using a first probability PE indicative of a probability that the job will be extended during a run time for the job, and a second probability PR indicative of a probability that the job will be decreased during the run time for the job. As an example, a Markov chain analysis based methodology can be adopted for computing the expected size. As mentioned previously, the numbers within the circles representing the non-leaf nodes 701, 703, and 705, as well as the numbers within the circles representing the leaf nodes 707, 709, 711, and 713, indicate the total number of clusters that can be accessed in the sub-tree rooted at that node circle. In addition to these numbers, the number of available clusters at each non-leaf node 701, 703, and 705 are also stored.

Next, at block 803, the value of enum+stdev_num is compared to the number of available clusters at each non-leaf node through a 'Depth First Search' (DFS) procedure. Illustratively, the DFS procedure could, but need not, be performed by traversing the left sub-tree of every non-leaf node first. Alternatively or additionally, the DFS procedure could, but need not, be performed by traversing the right sub-tree of every non-leaf node first. At block 805, when the number of available clusters is just more than 'enum+stdev_num' and going down one level further in the tree, the number of available clusters is less than enum+stdev_num, that particular sub-tree is chosen for placement of the job on the clusters of that particular sub-tree. In other words, the chosen sub-tree has enough numbers of clusters to be assigned to the job as per its expected size span: enum+stdev_num.

As indicated previously, one may employ either a "left first placement" policy or a "right first placement policy" for placing the jobs in the sub-tree structure. The term "left first placement" signifies the left sub-tree is first checked for a required number of 'enum+stdev_num' clusters before checking the right sub-tree. The term "right first placement" indicates that the right sub-tree is first checked for a required number of 'enum+stdev_num' clusters before checking the left sub-tree.

The above described algorithm can be formalized as follows:

Input—T: Bluegene/P binary tree structure; w: newly arrived job waiting to be placed; w.num: size of job; w.PE and w.PR.

Output—Ts: sub-tree in the binary tree T under which the job 'w' will be placed.

---

Algorithm:

0) Node nd = T.root
  1) Compute expected size 'enum' and standard deviation in size 'stdev_num' of the job 'w' using the probabilities PE and PR.
  2) Call DFS(nd) and compare value of enum+stdev_num with number of available clusters, 'nd.a', at non-leaf node 'nd'. While doing DFS, traverse the left sub-tree of every non-leaf node first.
  3) If (enum+stdev_num < nd.a) then
        if (nd is non-leaf node && not backtracking on DFS)
            nd = nd.left_subtree
            Goto Step-2
        if (nd is non-leaf node && backtracking on DFS && nd is unexplored)
            nd = nd.right_subtree
            Goto Step-2
        else if (nd is leaf node)
            Backtrack on DES //as per standard DFS backtracking procedure
        end if
     else if (enum+stdev_num >= nd.a) then
        Place job on clusters that can be accessed through sub-tree Ts rooted at nd.parent
     end if
  4) End of Algorithm

---

The foregoing algorithm description can be generalized to the case when processors are clustered in groups of a generic number 'n' instead of just 32. The foregoing discussion is still valid. In generalized cases, it will be assumed that the size of a job may be specified only in integer multiples of 'n' processors. The foregoing algorithm description can also be generalized for cases where, instead of a binary tree structure, the HPC environment processors are accessible through any generic tree structure (not necessarily binary). In such cases, the implementation of DFS must be for a generic tree structure (not binary). In addition, the second 'if' statement with in the 'If (enum<nd.a)' statement in Step-3 of the foregoing algorithm will change to:

```
if (nd is non-leaf node && backtracking on DFS && nd is un-
explored)
        nd = nd.next_unexplored_subtree
        Goto Step-2.
```

Instead of a Markov chain analysis based methodology, any other methodology could be adopted for computing the expected size of a job. It may be implicitly assumed that the structure of a tree is known from the underlying HPC architecture. However, one may generalize to cases where the structure is not known and must be created or mapped from a knowledge of the HPC architecture.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising at least one processor and at least one memory including computer program code, wherein the at least one processor, in response to execution of the computer program code, is configured to cause the apparatus to perform at least the following:

allocating a quantity of processors for processing a job in a high-performance computing environment to provide an initial allocation, wherein the initial allocation of the quantity of processors for the job is allocated to at least one of: a first area of processors which is more densely occupied than a second area of processors based on a first probability indicative of a probability that the job will have an increased computing demand during the run time for the job; and a second area of processors which is more sparsely occupied than a first area of processors based on a second probability indicative of a probability that the job will have decreased computing demand during the run time for the job; and modifying the initial allocation during a run time of the job by performing one or more of: increasing the allocated quantity of processors in response to an increased computing demand for the job by allocating one or more free processors from a pool of free processors which are configured to meet the increased computing demand for the job; or decreasing the allocated quantity of processors in response to a decreased computing demand for the job by reallocating one or more processors from the allocated quantity of processors to the pool of free processors wherein the allocated one or more free processors configured to meet the increased demand for the job are within a vicinity of the quantity of processors used to provide the initial allocation.

2. The apparatus of claim 1 wherein the initial allocation is stored in a memory in a cloud environment.

3. The apparatus of claim 1 wherein the modified initial allocation is stored in a memory in a cloud environment.

4. An apparatus comprising at least one processor and at least one memory including computer program code, wherein the at least one processor, in response to execution of the computer program code, is configured to cause the apparatus to perform at least the following:

accepting a job having a job size representing a number or quantity of processors to be initially allocated for the job;

computing an expected size, and a standard deviation in size, for the accepted job;

adding the expected size to the standard deviation in size to determine a sum;

comparing the sum to a number of available clusters at each of a plurality of non-leaf nodes of a tree representing a high-performance computing environment; and in response to the number of available clusters being more than the sum at a sub-tree of the tree and, going down one level further in the sub-tree, the number of available clusters being less than the sum, selecting the sub-tree for the accepted job such that the accepted job is placed on one or more clusters associated with the selected sub-tree, wherein the computing the expected size, and the standard deviation in size, is performed by at least one of: using a first probability indicative of a probability that the job will be extended in size during a run time for the job; and using a second probability indicative of a probability that the job will be decreased in size during the run time for the job.

5. The apparatus of claim 4 wherein the computing the expected size, and the standard deviation in size, for the accepted job, is performed by using the first probability indicative of the probability that the job will be extended in size during the run time for the job.

6. The apparatus of claim 5 wherein the computing the expected size, and the standard deviation in size, for the accepted job, is performed by using the second probability indicative of the probability that the job will be decreased in size during the run time for the job.

7. The apparatus of claim 4 wherein the comparing is performed using a depth first search procedure.

8. The apparatus of claim 7 wherein the depth first search procedure is performed by traversing a left sub-tree at each of the plurality of non-leaf nodes prior to traversing a right sub-tree at each of the plurality of non-leaf nodes.

9. The apparatus of claim 7 wherein the depth first search procedure is performed by traversing a right sub-tree at each of the plurality of non-leaf nodes prior to traversing a left sub-tree at each of the plurality of non-leaf nodes.

* * * * *